Patented Feb. 25, 1947

2,416,522

UNITED STATES PATENT OFFICE 2,416,522

N-ALKYLBENZAMIDE AND PYRETHRUM INSECTICIDES

Samuel I. Gertler and Herbert L. J. Haller, Washington, D. C., assignors to the United States of America, as represented by Claude R. Wickard, Secretary of Agriculture, and his successors in office No Drawing. Application October 30, 1943, Serial No. 508,388

9 Claims. (Cl. 167—24)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to insecticidal compositions containing pyrethrins, the active principles of pyrethrum flowers, and has for its object the provision of an improved composition of this type.

Insecticidal compositions containing pyrethrins are widely used to combat insect pests such as flies, mosquitoes, gnats, and the like. The pyrethrins are frequently employed in a solvent of the hydrocarbon or mineral oil type, such as odorless kerosene, naphtha, and so forth. While these insecticidal compositions have good toxic properties and are useful for the control of household insects and the like, they are expensive due to the cost of pyrethrum.

We have found that certain compounds of the class known as N-substituted benzamides, while possessing little or no toxicity to the aforementioned household pests in themselves, increase the toxicity of the pyrethrins to a decidedly advantageous extent. We have found, for instance, that when certain N-substituted benzamides are incorporated with pyrethrins in odorless kerosene, an insecticidal composition is obtained which is more effective against the ordinary housefly than can be accounted for by the additive effects of the components. These compounds may therefore be classed as synergists for pyrethrins.

On the basis of these findings, the present invention contemplates an improved insecticidal composition containing pyrethrins and one of the compounds hereinafter mentioned. We prefer to use the composition as a spray in a mineral oil in which pyrethrum and the synergist are mutually soluble. However, we do not restrict our invention to such use and the new insecticidal composition may be used in other solvents and in combination with other insecticides such as derris, cube, rotenone, organic thiocyanates and the like. The synergist compounds may be prepared by reacting benzoyl chloride with the corresponding aliphatic amine.

The efficiency of these compounds, as synergists when tested against houseflies, is shown by the results in the following table. All of the compositions listed in the table were made up in a refined kerosene solution. The killing effect of a pyrethrins concentration of 0.5 mg. per ml. was adopted as a standard for comparison and was figured as 100 percent efficiency.

| Composition tested | Mortality (48 hrs.) | Efficiency |
|---|---|---|
|  | Per cent | Per cent |
| 0.5 mg. pyrethrins per ml | 17 | 100 |
| 1.0 mg. pyrethrins per ml | 33 | ---- |
| 1.0% N-butylbenzamide | 7 | 41 |
| 0.5 mg. pyrethrins per ml.+1.0% N-butylbenzamide | 65 | 382 |
| 1.0% N,N-dibutylbenzamide | 1 | 6 |
| 0.5 mg. pyrethrins per ml.+1.0% N,N-dibutylbenzamide | 50 | 294 |
| 1.0% N-amylbenzamide | 1 | 6 |
| 0.5 mg. pyrethrins per ml.+1.0% N-amylbenzamide | 53 | 312 |
| 1.0% N,N-diisobutylbenzamide | 1 | 6 |
| 0.5 mg. pyrethrins per ml.+1.0% N,N-diisobutylbenzamide | 35 | 206 |

The table above shows that the addition of 1.0 percent of representative species of the synergist compounds to a solution containing only 0.5 mg. of pyrethrins per ml. gave insecticidal compositions which had an efficiency against houseflies ranging from 206 to 382 percent as compared with the efficiency of the pyrethrins solution alone, or an increase in effectiveness of roughly from 2 to 4 times. For purposes of comparison, an O. T. I. standard fly spray which contained twice the pyrethrins content of the compositions listed in the table was tested at the same time. It was found to be only as efficient as the composition giving the lowest kill and only approximately one-half as efficient as the composition giving the highest kill. It will be seen, therefore, that the use of these synergist compounds effects a considerable saving in pyrethrum.

The figures used in illustrating our invention are for comparison only and the proportions of synergist compounds and pyrethrins may be varied over a wide range.

Having thus described our invention, we claim:

1. A method of destroying insects consisting in contacting the insects with a spray composition comprising a fluid carrier having dissolved therein N-butylbenzamide and pyrethrins.

2. An insecticidal composition comprising a fluid carrier having dissolved therein N-butylbenzamide and pyrethrins.

3. A method of destroying insects consisting in contacting the insects with a spray composition comprising a fluid carrier having dissolved therein, N,N-dibutylbenzamide and pyrethrins.

4. An insecticidal composition comprising a fluid carrier having dissolved therein N,N-dibutylbenzamide and pyrethrins.

3

5. A method of destroying insects consisting in contacting the insects with a spray composition comprising a fluid carrier having dissolved therein N-amylbenzamide and pyrethrins.

6. An insecticidal composition comprising a fluid carrier having dissolved therein N-amylbenzamide and pyrethrins.

7. A method of destroying insects comprising contacting the insects with an insecticidal composition containing a compound selected from the group consisting of N-butylbenzamide, N,N-dibutylbenzamide, N-amylbenzamide and N,N-diisobutylbenzamide, and an extract of pyrethrum flowers.

8. A method of destroying insects consisting in contacting the insects with a spray composition comprising a fluid carrier having dissolved therein a compound selected from the group consisting of N-butylbenzamide, N,N-dibutylbenzamide, N-amylbenzamide and N,N-diisobutylbenzamide, and pyrethrins.

9. An insecticidal composition comprising a fluid carrier having dissolved therein a compound selected from the group consisting of N-butylbenzamide, N,N-dibutylbenzamide, N-amylbenzamide and N,N-diisobutylbenzamide, and pyrethrins.

SAMUEL I. GERTLER.
HERBERT L. J. HALLER.

REFERENCES CITED

The following references are of record in the file of this patent:

UNITED STATES PATENTS

| Number | Name | Date |
|---|---|---|
| 2,166,120 | Bousquet | July 18, 1939 |